Patented Nov. 21, 1950

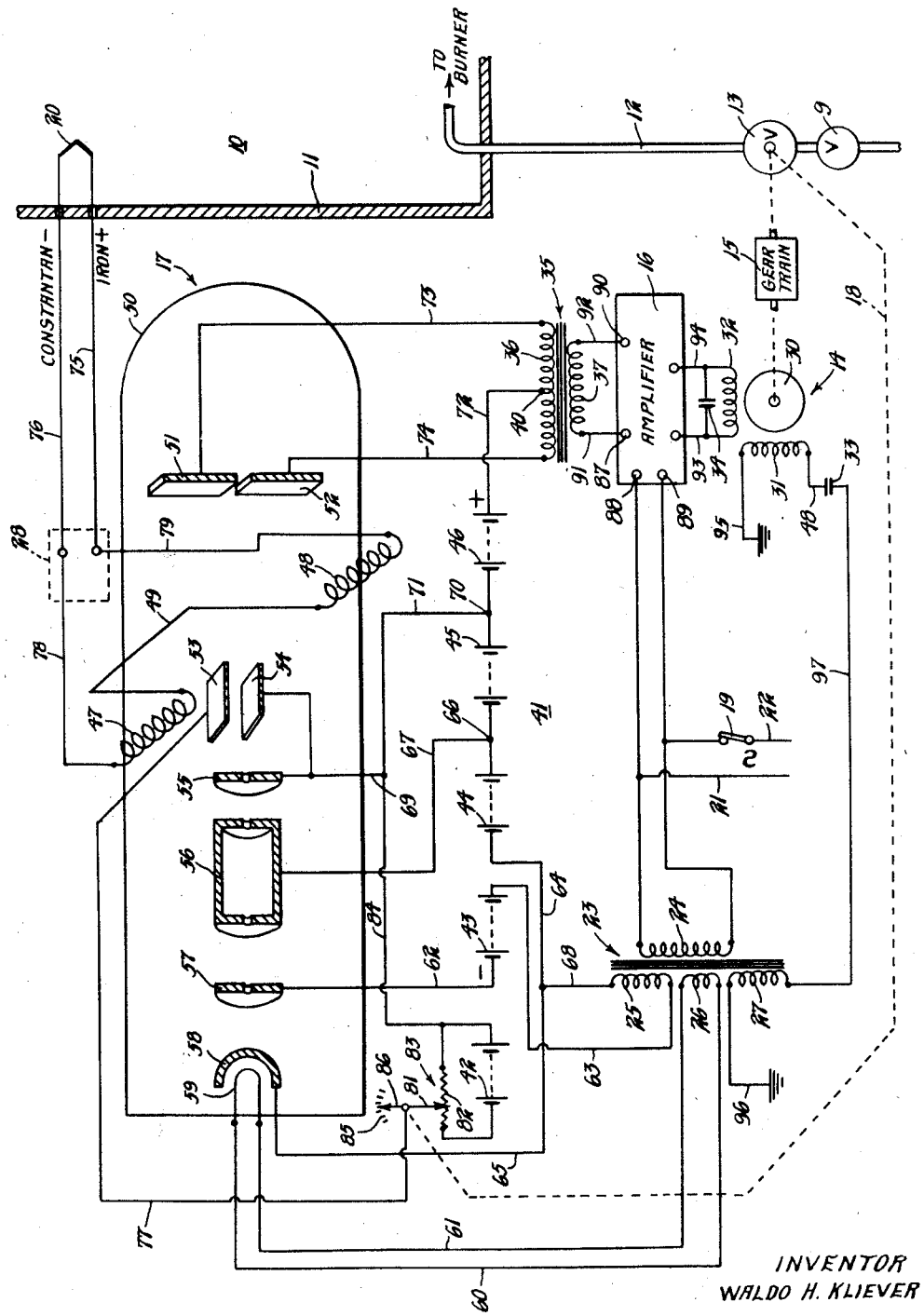

2,530,775

UNITED STATES PATENT OFFICE 2,530,775

CONTROL APPARATUS

Waldo H. Kliever, Minneapolis, Minn., assignor to Minneapolis-Honeywell Regulator Company, Minneapolis, Minn., a corporation of Delaware Application November 9, 1944, Serial No. 562,679

3 Claims. (Cl. 236—78)

This invention relates to condition control systems and more particularly to improvements in such systems, which are concerned with the control of electric motors and with utilization of combinations of the forms of electrical energy.

The various characteristics of alternating and direct currents have long been known, and the properties of each type of electrical energy which make it especially adapted to particular applications are familiar to electrical engineers. For example, alternating current makes possible the use of transformers to increase and decrease voltages, and permits the performance of all functions which depend for their operability on phase relationships. This, on the other hand, is a disadvantage for some applications where, for example, it may be desired that voltages from a number of sources be added, exerting each its proper influence in the total voltage; the phases of alternating voltages to be so added must be accurately known if the addition is to be a success, and as a result the process is much more complicated than the addition of unidirectional voltages.

Numerous attempts have been made to find ready means for converting significant potentials from one form of energy to the other. In converting A. C. to D. C., the rotary converter and the electronic rectifier are familiar examples of structures having this intent and adapted for use in power applications, while the crystal detector and the diode detector are examples of the same sort of device adapted to communications use.

The fact remains, however, that no completely satisfactory method of converting one form of electrical energy to another has heretofore been developed. Most devices of this sort are unduly complicated by the necessary consideration of phase in alternating currents, and the expedients thus far resorted to introduce spurious signals which may be of considerable significance for accurate work, even to the extent of prohibiting the use of such devices where extreme accuracy is required.

There are also occasions where it is desired to actuate an electric motor, particularly desirable because of its characteristics when energized with alternating current, under the control of a member operating most satisfactorily when energized with direct current. For example, it may be desirable to control a reversing motor, which most conveniently comprises a split-phase motor operated by alternating current, in accordance with the electrical output of a thermocouple which is, of course, unidirectional. Means have not heretofore been available for accomplishing this with satisfactory accuracy and simplicity.

My invention is directed to the solution of problems of the nature just outlined, by the use of an electron discharge device of a generally familiar nature, but having certain modifications, and being comprised in certain circuit arrangements, which are novel and which make possible the accomplishment of the following objects.

An object of my invention is to provide a new and improved electric circuit, including a controlled electron beam.

Another object of my invention is to provide new and improved motor control apparatus.

Another object of my invention is to provide a new and improved temperature control system.

A further object of my invention is to provide new and improved means for converting a unidirectional signal into an alternating current power response which reverses in phase and varies in amplitude with reversal in polarity and change in magnitude of the unidirectional signal.

A further object of my invention is to provide new and improved means for controlling an alternating current motor from a direct current signal.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the drawing, the single figure is a diagrammatic showing of my invention as applied to the control of the temperature in a space.

Construction

In the drawing I have shown a space 10, to be heated, which may be enclosed by any suitable wall 11 and may comprise for example an oven, a heat-treating chamber, or a furnace. The space may be heated by any suitable burner, not shown, which is adapted to be supplied with liquid or gaseous fuel through a conduit 12 under the control of a valve 13. Valve 13 is actuated by a motor 14 through a suitable gear reduction arrangement 15: a manual shut-off valve 9 may also be provided.

Motor 14 comprises a rotor 30 and a pair of field windings 31 and 32, with which a pair of condensers 33 and 34 are respectively associated. Field windings 31 and 32 of motor 14 are spaced by 90 electrical degrees in the construction of the motor, and rotor 30 is of the familiar squirrel cage type. It follows therefore that if windings 31 and 32 are energized by alternating currents in quadrature, motor 14 operates in a forward or reverse direction, depending on whether the current in winding 31 leads or lags that in winding 32: this practice is familiar to those skilled in the art.

In general, motor 14 is controlled by an amplifier 16 whose input signal comes from an electron discharge device 17, the latter being controlled in a manner to be later described by a thermocouple 20 located in chamber 18. The cold junction for thermocouple 20 is located in a temperature stabilized chamber 28: according to the needs of the application in which my circuit is to be used, the temperature of this chamber may be thermostatically regulated, or the chamber may simply be insulated to provide a stabilizing heat reservoir surrounding the cold junction.

Alternating current of a power frequency is provided for energizing amplifier 16, motor 14, and discharge device 17 through a pair of conductors 21 and 22, the latter including a main switch 19. The electrical energy is distributed in part by a transformer 23 having a primary winding 24 and a plurality of secondary windings 25, 26, and 27.

Amplifier 16 is connected with discharge device 17 through a transformer 35 having a secondary winding 37 and a primary winding 36 having a center tap 40.

For providing energizing voltages for electron discharge device 17, I have shown a power source 41 comprising a plurality of batteries 43, 44, 45, and 46. An independent battery 42, and a potentiometer 83 comprising a resistance winding 82 and a contacting slider 81, are also provided: this battery and the resistance winding are connected in parallel. It will be understood that power source 41 need not necessarily comprise batteries, but that a suitable source of rectified and filtered A. C. may be used for this purpose.

Electron discharge device 17 is shown to comprise an envelope 50 enclosing a pair of anodes 51 and 52, a pair of deflecting plates 53 and 54, an accelerating electrode 55 electrically connected with deflecting plate 54, a focusing electrode 56, a control grid 57, a cathode 58, and a cathode heater 59. A pair of deflecting coils 47 and 48, connected by a conductor 49, are coaxially mounted outside the tube, their common axis being parallel to plates 53 and 54 and intersecting the axis of the tube.

*Operation*

The operation of the structure just recited will now be described. In the inoperative condition of my system, target plates 51 and 52 are maintained at a positive potential with respect to cathode 52 by batteries 44, 45, and 46, which are connected in series. The circuit may be traced from cathode 58 through conductors 65 and 64, batteries 44, 45, and 46 in series, and conductor 72, to center tap 40 of secondary winding 36. From here a pair of paths may be traced, one through the left hand portion of winding 36 and conductor 74 to plate 52 and the other through the right hand portion of winding 36 through conductor 73 to plate 51.

Control grid 57 is maintained at a negative potential with respect to cathode 58 by means of battery 43. The circuit may be traced from cathode 58 through conductors 65 and 68, secondary winding 25 of transformer 23, conductor 63, battery 43, and conductor 62 to control grid 57.

The focusing electrode 56 is maintained at a positive potential with respect to cathode 58 by battery 44. The circuit may be traced from cathode 58 through conductors 65 and 64, battery 44, common terminal 66 between the positive terminal of battery 44 and the negative terminal of battery 45, and conductor 67, to focusing electrode 56.

The accelerating electrode 55 is maintained at a positive potential with respect to cathode 58 by batteries 44 and 45, which, as has been pointed out, are connected in series. The circuit may be traced from cathode 58 through conductors 65 and 64, batteries 44 and 45, the common terminal 70 between the positive terminal of battery 45 and the negative terminal of battery 46, and conductors 71 and 69 to electrode 55.

Deflecting plate 53 is maintained at a negative unidirectional potential with respect to deflecting plate 54 and accelerating electrode 55 by a voltage derived from battery 42 through potential divider 83. The circuit may be traced from accelerating anode 55 through conductors 69 and 84, the right hand portion of winding 82 of potential divider 83, slider 81, and conductor 77 to deflecting plate 53.

Thermocouple 20 may be of any conventional type and may comprise, for example, a first conductor 75 of iron and a second conductor 76 of constantan. At the cold junction 28, conductor 76 is connected with deflecting coil 47 through conductor 78, while conductor 75 is connected with deflecting coil 48 through conductor 79. Thermoelectrically generated current therefore flows in coils 48 and 47 from conductor 75 to conductor 76 to create a magnetic field traversing tube 50 parallel to the coil axes: as is well known to those skilled in the art, this results in deflection of the electron beam in a plane at right angles to the direction of the field, that is, from plate 51 to plate 52 or vice versa, depending on the direction of winding of the coils.

Assuming that my system is to be set into operation, it will be understood that in the absence of any fire in chamber 18, my system must operate in such fashion that valve 13 is wide open to permit the passage of fuel to the burner. To set my system into operation valve 9 is manually opened to permit the passage of fuel to the burner, and a fire is started in the chamber. At the same time, main switch 19 is closed energizing primary winding 24 of transformer 23, as well as input terminals 88 and 89 of amplifier 16, from conductors 21 and 22. By transformer action an induced voltage appears in secondary winding 26 of transformer 23, energizing cathode heater 59 through conductors 60 and 61. When heater 59 reaches a suitable temperature, electron emission from cathode 58 takes place, due to the presence of the positively charged plates 51 and 52 spaced from the cathode 58. Due to the action of focusing electrode 56 and accelerating electrode 55, a beam of electrons passes from cathode 58 between deflecting plates 53 and 54 and is directed toward plates 51 and 52.

Energization of primary winding 24 at the same time induces an alternating voltage in secondary winding 25 of transformer 23, which results in a potential difference being impressed between cathode 58 and control electrode 57 which is superimposed on that provided by battery 43. It will be recalled that in the circuit traced above between the cathode and control electrode 57, the secondary winding 25 and the battery 43 are connected in series. The combined effect of the voltages from secondary windings 25 and battery 43 is to modulate the electron beam in intensity, the amplitude of the modulation being determined by the voltage derived from winding 25 and the constant value of intensity about which the modulation takes place being determined by battery 43.

The electron beam emitted from accelerating anode 55 is directed axially of the envelope so that in the absence of other forces the beam is of substantial size and impinges equally on plates 51 and 52. However, the beam passes between deflecting plates 53 and 54, the former of which may attract or repel the beam depending on the polarity of battery 42 and on the setting of slider 81, and also through the field of coils 47 and 48, which has a further deflecting effect on the beam, depending on the magnitude of the thermoelectric current flowing in the coils. Since the current output of a thermocouple of this type, for any temperature differential to which it may be exposed, is known, it is possible to arrange for operation of the furnace or oven at any desired temperature by adjusting slider 81 to derive from battery 42 a voltage equal in deflecting effect on the beam, to the thermoelectric current of thermocouple 20 at the desired temperature. Slider 81 may operate a pointer 86 moving over a scale 85 graduated either in units of voltage or in units of temperature corresponding thereto to give an indication of operation of the device.

In initiating operation of my system, the user sets slider 81 so that the pointer indicates the desired temperature, and the system is ready to operate. Unless the temperature in the space is already that desired, the deflection of the beam due to the voltage between plates 53 and 54 is not exactly counteracted by the deflection due to current in coils 47 and 48. Suppose the coils are so wound that increasing thermoelectric current acts to increasingly deflect the beam toward plate 51. Since the temperature in the space is too low, the deflective effect of the plates predominates, and a resultant deflection of the electron beam from its central direction takes place so that it no longer impinges equally upon targets 51 and 52. Since plate 53 is negative with respect to plate 54, the negative beam of electrons is repelled so that it impinges more on plate 52 and less on plate 51. Opposite winding of the coils, or opposite connection of the thermocouple, would require a reversal of the polarity of battery 42.

Anode current flows in conductors 74 and 73 in proportion to the relative impingement of these plates by the electron beam. Since these currents are derived from batteries 44, 45, and 46, and since they flow in opposite directions through secondary winding 36 from center tap 40, it is evident that unless the anode currents are equal the flux set up in the core of transformer 35 by the first current is not equal to the opposing flux set up by the other current, and there is a residual effective flux which induces an output voltage from secondary winding 37 of the transformer. The residual flux may be of a first time-phase relationship or in 180 degree phase relationship therewith, depending upon which anode current predominates. The induced voltage in secondary winding 37 is subject to the same phase reversal, and is impressed upon the input terminals 87 and 90 of amplifier 16 by conductors 91 and 92.

Energization of transformer 23 induces a potential in secondary winding 27 of the transformer, and this potential is impressed across field winding 31 of motor 14 through ground connections 96 and 95 and conductor 97, condenser 33, and conductor 48. In the same way, the output voltage from amplifier 16 is supplied to field winding 32 of motor 14 through conductors 93 and 94: the condenser 34 is connected across field winding 32 to bypass harmonics of the operating frequency.

Amplifier 16 is of such a nature that the output voltage is of the same phase as the input voltage. Such amplifiers are well known in the art and, since the details of such an amplifier are not essential to an understanding of my invention, the structure of the amplifier is not specifically illustrated here. The anode currents flowing in conductors 73 and 74 are in 180° phase relation with one another and with the modulating voltage derived from secondary winding 75. The voltage across secondary winding 37 of transformer 35 is therefore in phase with or 180 degrees out of phase with the modulating voltage, depending on which anode current is the larger. The voltage across field coil 32 is likewise in phase or 180 degrees out of phase with the modulating voltage because of the properties of the amplifier just set forth. The current in field winding 32 lags the voltage across it by 90 degrees as is well known to those skilled in the art.

The current through condenser 33 and field winding 31 is substantially in phase with the voltage across secondary winding 27. This is because the capacitance and the inductance of these members have been so chosen that the circuit is resonant at the frequency of the source, and the circuit presents only a resistive aspect to the secondary voltage. Since the voltages across windings 25 and 27 are in phase, and since the current in winding 31 is of the same phase, while that in winding 32 is leading or lagging by 90°, motor 30 is energized to rotate in a first direction if the beam impinges principally on plate 52 and in a second direction if the beam impinges principally on plate 51.

Under the starting conditions the temperature of space 10 is less than that desired and accordingly the deflective effect of the plates exceeds that of the coils. The electron beam therefore impinges principally upon plate 52 and the anode current in conductor 74 exceeds that in conductor 73. The induced voltage in 37, when transmitted through amplifier 16, is such as to cause operation of motor 14 in a first direction so as to open valve 13 if it is not already so wide open as to operate a conventional limit switch which is preferably used in conjunction with my invention, but which is not illustrated in the drawing for the sake of avoiding confusion.

Continued operation of the burner in space 10 results in a rise in the temperature in the space, to which thermocouple 20 responds by an increased current output. The deflective effect of coils 47 and 48 therefore increases, while that of plates 53 and 54 remains the same; accordingly the deflection of the electron beam from its central position decreases. When the temperature in space 10 has reached a desired value, the deflective effects of the plates and the coils are exactly equal and opposite, the electron beam impinges equally upon plates 51 and 52, and there is no induced voltage in secondary winding 37 of transformer 35. Field winding 32 of motor 14 is therefore not energized, and operation of the motor stops.

If due to lag between the operation of the burner and the indication of thermocouple 20, the temperature in space 10 increases beyond that desired, the current generated by thermocouple 20 continues to increase so that the deflective effect of the coils exceeds that of the plates. The electron beam is accordingly deflected from its central position so that it impinges more upon plate 51 than upon plate 52. Greater anode current flows in conductor 73 than in conductor 74 and current flows in field winding 32 which is of the opposite phase to that flowing in the winding in the case previously described. Motor 14 is accordingly energized to operate in the opposite direction, closing valve 13.

While it is apparent that regulation of the temperature in space 10 by the means already disclosed comprises a perfectly operative floating system of temperature control, there are occasions in which it is desired to have a follow-up system such that the circuit balances itself at the same time that the correction in the valve setting is made. To accomplish this a mechanical connection 18 may be provided between the operating shaft of valve 13 and the slider 81 of potentiometer 83 so that as the valve is actuated by motor 14 the potentiometer arm is simultaneously moved to change the potential of plate 53 with respect to plate 55. The mechanical connection between the valve and the slider, and the resistance increment of winding 82 per unit of travel of the slider, are such that when the slider has moved along the winding to where the electrostatic deflection of the electron beam is equal to and opposite the electromagnetic deflection, sufficient change in the position of valve 13 has taken place to change the temperature in space 10 by the desired amount, by altering the flow of fuel to the burner. If mechanical connection 18 is provided, it will be appreciated that a manual setting of slider 81 at the time of initiating operation of the device will no longer be necessary since, at the time the burner was last turned off and the temperature in the chamber fell to room temperature, operation of the system to maintain its balance naturally moved the slider to the starting position and opened the automatic valve 13 in preparation for a new cycle of operation.

Numerous objects and advantages of my invention have been set forth in the foregoing description together with details of the structure and function of the invention, and the novel features thereof are pointed out in the appended claims. The disclosure, however, is illustrative only, and I may make changes in detail, particularly in matters of shape, size, and arrangement of parts within the principle of the invention, to the full extent indicated by the broad and general meaning of the terms in which the appended claims are expressed.

I claim as my invention:

1. In a device of the class described, in combination, an electron discharge device comprising means directing a beam of electrons along a normal axis to comprise a beam current, independent electrostatic and electromagnetic deflecting means, a plurality of anodes spaced about said axis for impingement by said beam, means energizing said device, means modulating the intensity of said beam at a selected frequency, thermoelectric signal generating means responsive to the temperature in a space, means connecting said generating means to said electromagnetic deflecting means, whereby to deflect said beam from said axis to vary the differential impingement of said beam upon said anodes, an amplifier, a motor controlled by said amplifier, means associating the anode currents of said discharge device, in opposed relation, with said amplifier, whereby to control the operation of said motor, and means actuated by said motor for causing a change in the temperature of said space opposite to that causing said response of said generator, a standard source of electrical energy, and means actuated by said motor for variably energizing said electrostatic deflecting means from said standard source in opposition to said thermoelectric energization of said first deflecting means.

2. In a device of the class described, in combination: a source of alternating current of a selected frequency; a motor designed for operation by means of alternating current of said frequency; an amplifier for controlling operation of said motor; an electron discharge device including a plurality of anodes and means directing a beam of electrons along an axis passing between said anodes, so that said beam normally impinges equally upon said anodes to comprise equal anode currents; means including said source for modulating the intensity of said beam at said frequency, whereby to impart to said anode currents components of said frequency; electrostatic and electromagnetic means for deflecting said beam from said axis, whereby to destroy the equality of said anode currents; a thermoelectric signal generating member responsive to the temperature in a space; means connecting said member to said electromagnetic deflecting means; means associating the anode currents of said discharge device, in opposed relation, with said amplifier to cause reversible operation of said motor, a voltage source, and means energizing said electrostatic deflecting means from said source in accordance with operation of said motor.

3. In a device of the class described, in combination: a plurality of anodes; means directing a beam of electrons along an axis passing between said anodes so that said beam normally impinges equally upon said anodes to comprise equal anode currents; means modulating the intensity of said beam at a selected frequency, whereby to impart to said anode currents alternating components of said frequency; a motor designed for operation by means of alternating current of said frequency; electromagnetic means for deflecting said beam from said axis, whereby to destroy the equality of said anode currents; means utilizing any inequality between said anode currents to cause operation of said motor in a sense dependent on the sense of said inequality; and electrostatic means actuated by said motor for causing said beam to return to its undeflected position.

WALDO H. KLIEVER.

REFERENCES CITED

The following references are of record in the file of this patent:

UNITED STATES PATENTS

| Number | Name | Date |
| --- | --- | --- |
| 2,096,653 | Soller | Oct. 19, 1937 |
| 2,249,494 | Ramo | July 15, 1941 |
| 2,314,302 | Ziebolz | Mar. 16, 1943 |
| 2,348,177 | Keeler | May 2, 1944 |
| 2,428,747 | Ziebolz | Oct. 7, 1947 |
| 2,441,269 | Hartig | May 11, 1948 |